United States Patent [19]

Ball et al.

[11] 4,242,233

[45] Dec. 30, 1980

[54] METHOD FOR PREPARING ALUMINOSILICATES, THEIR USE AS CATALYST SUPPORTS AND CATALYSTS, AND METHOD FOR PRODUCING CATALYSTS THEREFROM

[75] Inventors: William J. Ball, Capel; Keith W. Palmer, Weybridge; David G. Stewart, Epsom, all of England

[73] Assignee: The British Petroleum Company Limited, London, England

[21] Appl. No.: 968,401

[22] Filed: Dec. 11, 1978

[30] Foreign Application Priority Data

Dec. 23, 1977 [GB] United Kingdom ............... 53645/77

[51] Int. Cl.$^3$ ..................... C01B 33/28; B01J 29/06
[52] U.S. Cl. .......................... 252/431 N; 252/455 Z; 260/448 C; 423/328; 423/329
[58] Field of Search ................. 423/328–330; 260/448 C; 252/431 N, 455 Z

[56] References Cited

U.S. PATENT DOCUMENTS

| | | | |
|---|---|---|---|
| 3,702,886 | 11/1972 | Argaver et al. | 423/328 |
| 4,089,929 | 5/1978 | Christophliemk et al. | 423/118 |

FOREIGN PATENT DOCUMENTS

| | | |
|---|---|---|
| 1955095 | 9/1970 | Fed. Rep. of Germany. |
| 2817577 | 10/1978 | Fed. Rep. of Germany. |
| 2746844 | 4/1979 | Fed. Rep. of Germany. |
| 1161974 | 8/1969 | United Kingdom. |
| 1365318 | 8/1974 | United Kingdom ............... 423/329 |
| 1471440 | 4/1977 | United Kingdom ............... 423/329 |

OTHER PUBLICATIONS

Charnell "Journal of Crystal Growth" vol. 8 (1971), pp. 291–294.

Zeitschrift fur Chemie, 13th Year, HFRT 3, 1973, pp. 109–110.

Richter "Textbook of Organic Chemistry" 2nd Ed. 1948, p. 244.

*Primary Examiner*—Edward J. Meros
*Attorney, Agent, or Firm*—Brooks, Haidt, Haffner & Delahunty

[57] ABSTRACT

Aluminosilicates containing an organic nitrogen cation are prepared by mixing sources of silica, alumina and an alkali metal, water and either mono-ethanolamine or mono-propanolamine, or a derivative, or the precursors or a combination thereof and maintaining the mixture at a temperature in the range from 80° to 210° C. and a pressure in the range from 70 to 400 psig for over 4 hours. In a preferred embodiment the alkanolamines are prepared in situ' by reaction of the corresponding alkylene oxide with ammonia. Aluminosilicates so-prepared can be used without modification as catalysts and catalyst supports. Catalytic activity can be enhanced by, for example, reducing the sodium content or impregnating with a compound of one or more metals belonging to Groups 1B, 11B, 111A, 1VA, VA and V111 or reaction with a compound of one or more non-metals of Group 111A and VA of the Periodic Table.

9 Claims, No Drawings

METHOD FOR PREPARING ALUMINOSILICATES, THEIR USE AS CATALYST SUPPORTS AND CATALYSTS, AND METHOD FOR PRODUCING CATALYSTS THEREFROM

The present invention relates to a method for preparing aluminosilicates useful without modification as catalyst supports and conversion catalysts and to their further modification into catalysts. More particularly this invention relates to a method for preparing aluminosilicates containing organic nitrogen cations from a reaction mixture containing either mono-ethanolamine or mono-propanolamine or derivatives, mixtures or precursors thereof.

Aluminosilicates, both natural and synthetic, have been shown to contain a wide variety of positive ions. These aluminosilicates are rigid three-dimensional networks of $SiO_4$ and $AlO_4$ in which the tetrahedra are crosslinked by the sharing of oxygen atoms whereby the ratio of the total aluminium and silicon atoms to oxygen is 1:2. The electrovalence of the tetrahedra containing aluminium is balanced by the inclusion of a cation in the three dimensional structure. This cation in the initially formed aluminosilicate is generally an alkali metal. More recently, the cation has included organic nitrogen cations notably quaternary ammonium cations such as tetramethylammonium, tetraethylammonium, tetrapropylammonium and tetrabutylammonium. Inorganic cations can be exchanged either in their entirety or partially by another type of cation utilising ion exchange techniques in a conventional manner. On the other hand, due to pore size limitations, organic cations are not necessarily susceptible to further cation exchange. In the hydrated form molecules of water occupy the spaces between the tetrahedra.

In the past, techniques of synthesising aluminosilicates have involved the use of solutions containing a source of silica, alumina, alkali metal and the cation in the form in which it would exist in the synthesised aluminosilicate. This method became rather expensive with the advent of crystalline aluminosilicates containing tetraalkylammonium cations. The synthesis of these aluminosilicates involved the addition of expensive quaternary ammonium cations to a reaction mixture in order to obtain the desired aluminosilicate. Furthermore in order to exchange an ammonium or other cation into the aluminosilicate prior to producing the active form of the catalyst it was necessary to calcine the aluminosilicate.

British Pat. No. 1,471,440, claiming a method for synthesising a crystalline aluminosilicate zeolite containing an organic nitrogen cation, wherein a reaction mixture comprising source of silica, alumina and alkali metal, water and a primary amine having 2 to 10 carbon atoms is prepared and maintained under conditions of temperature and pressure to effect crystallisation of said aluminosilicate zeolite, purports to overcome the disadvantages inherent in the aforesaid methods for synthesising crystalline aluminosilicates. The Examples in the complete specification describe the use of a wide variety of primary amines in the preparation of crystalline aluminosilicates.

It has now been found that aluminosilicates containing an organic nitrogen cation can be prepared from mono-ethanolamine, mono-propanolamine or derivatives, mixtures or the precursors of same. Mono-ethanolamine and mono-propanolamine are themselves readily available on an industrial scale and their precursors are relatively inexpensive and are available as bulk industrial chemicals. Although British Patent Specification No. 1,471,440 describes the use of primary amines in the synthesis of aluminosilicates it is somewhat surprising that mono-alkanolamines, being primary amines containing also a functional hydroxyl group, are effective.

Thus the present invention provides a method for preparing an aluminosilicate containing an organic nitrogen cation which method comprises mixing a source of silica, a source of alumina, a source of alkali metal, water and either mono-ethanolamine or mono-propanolamine, or a derivative, or the precursors or a combination of same and maintaining the mixture under reaction conditions which effect formation of the aluminosilicate.

Suitable sources of silica include, for example, sodium silicate, silica hydrosol, silica gel, silica sol, and silicic acid. The preferred source of silica is an aqueous colloidal dispersion of silica particles. A suitable commercially available source of silica is LUDOX Colloidal Silica manufactured by Du Pont (LUDOX is a Registered Trade Mark).

Suitable sources of alumina include, for example, sodium aluminate, aluminium sulphate and alumina. The preferred source of alumina is sodium aluminate prepared by dissolving alumina particles in excess sodium hydroxide solution.

Suitable sources of alkali metal include alkali metal hydroxides and alkali metal oxides. Preferably the alkali metal is sodium.

It will be appreciated that each source of silica, alumina and alkali metal can be supplied by one or more initial reactants and then mixed together in any order. For example sodium silicate is a source of both sodium and silica.

Mono-ethanolamines and mono-propanolamines, hereinafter to be referred to as mono-alkanolamines, are generally prepared by the reaction of an alkylene oxide with ammonia. The reaction may be represented as follows:

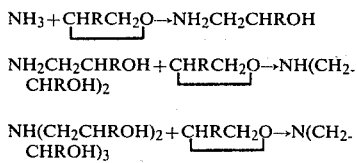

wherein R is either a H atom or a methyl group. Thus in practice reaction of ammonia with an alkylene oxide produces a mixture of mono-, di- and tri-alkanolamines which may be separated by fractionation techniques well-known in the art. Generally the mono-alkanolamine can readily be separated in a relatively pure form, leaving a mixture containing all the di- and tri-alkanolamine in admixture.

The reaction of ammonia and an alkylene oxide is exothermic and is usually carried out at a temperature in the range 50° to 100° C. and a pressure in the range 150 to 300 psi. The reaction may be carried out, at controlled temperature and pressure, either in a coil-type reactor by continuously pumping aqueous ammonia and alkylene oxide into the coil, or in a kettle-type reactor by slowly pumping the oxide into the ammonia solution contained in the agitated kettle. Because water aids temperature control by removing reaction heat it is advantageous to use aqueous ammonia at a concentration of 25 to 50%, although processes using low concentrations of water or anhydrous processes may be employed.

The relative proportions of mono-, di- and tri-alkanolamines that can be obtained by the above procedure are dependent upon the ratio of ammonia to alkylene oxide used. A large excess of ammonia favours the formation of the mono-alkanolamine.

Alkylene oxides will react with nearly all nitrogen compounds having one or more hydrogen atoms attached to the nitrogen. Thus a number of mixed mono-alkanolamines can be made by reacting ethylene oxide, with alkanolamines such as mono-isopropanolamine, or by reacting propylene oxide with mono-ethanolamine under the conditions hereinbefore described for its reaction with ammonia. Other types of amines besides alkanolamines may also be used as starting materials. Thus, aminoethyl-ethanolamine may be prepared by reacting ethylene diamine with ethylene oxide and N-(2-hydroxypropyl) ethylene diamine by reacting ethylene diamine with propylene oxide. The present invention also envisages the use of such mono-alkanolamine derivatives as the source of the organic nitrogen cation in the preparation of aluminosilicates.

Although the reaction of alkylene oxides and ammonia is the chief commercial method for the preparation of mono-alkanolamines, other means of synthesising these products are also known. For example, preparation may be carried out by the ammonolysis of a halohydrin as follows:

$$HOCHRCH_2Cl + 2NH_3 \rightarrow HOCHRCH_2NH_2 + NH_4Cl$$

Since alkylene oxides, such as ethylene oxide and propylene oxide, and ammonia are readily available on an industrial scale, mono-ethanolamines and mono-propanolamines are relatively inexpensive materials when compared with primary amines, for example.

Furthermore, and this is a particular advantage of the present invention, the mono-alkanolamines may be formed 'in situ' from their precursors during production of the aluminosilicate.

Thus a preferred embodiment of the present invention provides a method for preparing an aluminosilicate containing an organic nitrogen cation which method comprises mixing a source of silica, a source of alumina, a source of alkali metal, water, and the precursors of mono-ethanolamine or mono-propanolamine or a combination thereof comprising an alkylene oxide which is ethylene oxide or propylene oxide or a combination thereof and ammonia, and maintaining the mixture under reaction conditions which effect formation of the aluminosilicate.

The ammonia may be added as a gas or as an aqueous ammoniacal solution. Preferably an excess of ammonia over the stoichiometric amount required to form the mono-alkanolamine is used, thereby favouring the formation of the mono-alkanolamine. Provided that the molar ratio of ammonia to alkylene oxide added is greater than 1:1 it may vary within wide limits, though a ratio in the range 10:1 to 2:1 is preferred.

The mixing may be effected by passing one or other or both the alkylene oxide and the ammonia in the form of a vapour into an aqueous mixture containing the remainder of the reactants. Alternatively, the alkylene oxide and the ammonia are preferably added in the form of liquids to the aqueous mixture containing the source of silica, the source of alumina and the source of alkali metal.

In a preferred method of preparation an aqueous alkylene oxide solution is mixed with an aqueous ammoniacal solution and the resulting mixture is further mixed with a source of silica, a source of alumina, a source of alkali metal and water and the mixture maintained under reaction conditions which effect the formation of an aluminosilicate. In this embodiment of the invention it is believed that the formation of the aluminosilicate proceeds through the intermediate formation of the mono-alkanolamine.

Whether the ethanolamine or propanolamine is added as such or in the form of their precursors or as a derivative or combination of same, reaction conditions which effect the formation of the aluminosilicate may be, for example, a temperature in the range from 80° to 210° C., preferably from 135° to 190° C., and a pressure in the range from 70 to 400 psig, preferably from 100 to 250 psig. The mixture may be held under these conditions for a time not less than 4 hours, preferably from 20 to 60 hours.

The sources of silica, alumina and alkali metal, water and mono-alkanolamine may be mixed in quite wide proportions. Thus the ratio of the silica source to the alumina source may be in the range from 10:1 to 150:1, preferably from 20:1 to 100:1 based on the equivalent moles of silica and alumina in the respective sources. The alkali metal source may be present in an amount from 50 to 0.02, preferably from 10 to 0.1, moles of alkali metal per mole equivalent of total silica and alumina in the respective sources. The mono-alkanolamine may suitably be present in an amount from 50 to 0.02, preferably from 10 to 0.1, moles per mole equivalent of total silica and alumina in their respective sources. The amount of water is not critical to the performance of the invention.

The reaction is suitably carried out in a closed vessel capable of withstanding the elevated pressures generally employed during the process. Furthermore the reaction mixture is preferably agitated during the formation of the aluminosilicate. The solid aluminosilicate so-prepared may be filtered off and washed with water at a temperature in the range, for example, of from 15° to 95° C.

Aluminosilicates prepared by the method of the present invention may be used as conversion catalysts or as catalyst supports. Thus the aluminosilicate may be used on its own or admixed with up to 80% of another support material such as silica or alumina. Preferably the aluminosilicate is activated, suitably by heating in air at a temperature in the range 400° to 700° C. for a period of from 2 to 48 hours before use as a catalyst. The alkali metal present in the aluminosilicate may be exchanged using conventional techniques with one or more other metal cations. Alternatively the alkali metal may be exchanged to give the H-form of the aluminosilicate.

For many catalytic purposes it is desirable to reduce the sodium content, sodium being the most used alkali metal, of the aluminosilicates to a level of no more than 0.2% by weight, preferably below 0.15% by weight. This may be achieved by subjecting the aluminosilicate to ion exchange or, more usually, a succession of ion exchanges. Additionally, where substantially complete removal of the original alkali metal ion requires an inordinate number of separate successive exchanges, calcination between the first and second exchange may be used as a means for reducing the number of exchanges required.

Furthermore for catalytic purposes the aluminosilicate may be impregnated with a compound of one or more metals, preferably with a compound of one or more metals belonging to Groups IB, IIB, IIIA, IVA, VA and VIII of the Periodical Table of the Elements as published in the Handbook of Chemistry and Physics. Suitable metals include copper, silver, zinc, gallium, indium, thallium, lead, antimony, bismuth, iron, cobalt, nickel, ruthenium, rhodium, palladium, iridium and platinum. The impregnated aluminosilicate preferably contains from 0.1 to 5.0% by weight of the metal(s). The compounds of the metals used are suitably those compounds which will decompose on the application of heat to form the corresponding oxides and which are soluble in water, eg the nitrates or chlorides. The aluminosilicate may thus be impregnated with an aqueous solution of a compound of the desired metal and the impregnated mass thereafter calcined to produce the metal oxide 'in situ' deposited in the interstices of the aluminosilicate structure. In a further embodiment of the invention one or more non-metallic elements belonging to Groups IIIA and VA of the Periodic Table, especially boron and phosphorus, may be added to the aluminosilicate. The non-metallic element may be incorporated into the aluminosilicate by reaction with a suitable compound containing the non-metallic element, eg phosphoric acid, boric acid, trimethylphosphate or phosphorus trichloride followed by heating. The amount of the non-metallic element present in the impregnated aluminosilicate preferably ranges from 0.1 to 5.0% by weight.

The aluminosilicates so-prepared, with or without the hereinbefore described treatments and/or modifications, may be used as catalysts, either in the form of a fixed or fluidised bed, in alkylation, dehydrocyclodimerisation, oligomerisation, isomerisation and hydrogenation reactions. Additionally the aluminosilicates may be used as catalysts in the dehydration of alcohols and ethers.

The following Examples are given for the purpose of illustrating the invention.

EXAMPLE 1

Alumina, Laporte Type A (0.85 g) was dissolved in a hot solution of sodium hydroxide (1.3 g) in deionised water (25 ml). To this was added a mixture of Ludox colloidal silica (50 g, containing 30% silica) in a solution of mono-ethanolamine (12.5 g) dissolved in deionised water (37.5 g).

The resultant mixture was then placed in a revolving stainless steel pressure and heated at 170° C. for 48 hours. The resultant solid product was filtered and washed with deionised water (500 ml). The filter-cake was suspended in an aqueous solution of ammonia (100 ml 910 ammonia solution/100 ml deionised water) and stirred for one hour. The mixture was filtered and the solid washed with deionised water (500 ml). After washing, the aluminosilicate so-prepared was dried at 120° C. for 16 hours.

EXAMPLE 2

Ethylene oxide (11 g) and 910 ammonia solution (42 ml, containing 25% ammonia) were cooled to 5° C. and then mixed with stirring. Alumina, Laporte Type A (1.7 g) was dissolved in a hot solution of sodium hydroxide (2.6 g) in deionised water (25 ml). The solution was cooled to room temperature and added with stirring to Ludox colloidal silica (100 g, containing 30% silica) and deionised water (75 ml). This mixture was cooled to 5° C. and the ethylene oxide/ammonia solution was added with stirring.

The resultant mixture was allowed to warm to room temperature, placed in a revolving stainless steel pressure vessel and heated at 170° C. for 60 hours. The resultant solid product was cooled to room temperature, filtered and washed with deionised water (500 ml). The filter-cake was suspended in an aqueous solution of ammonia (200 ml 910 ammonia solution/200 ml deionised water) and stirred for 30 minutes. The mixture was filtered and the solid washed with deionised water (200 ml). After washing the aluminosilicate so-prepared was dried at 120° C. for 16 hours.

This example demonstrates a method for preparing an aluminosilicate starting with the precursors of the mono-ethanolamine, namely ethylene oxide and ammonia.

EXAMPLE 3

The aluminosilicate prepared as described in Example 1 was crushed to pass 16 mesh (BSS) and activated by heating in air at 500° C. for 16 hours.

The catalytic activity of the activated aluminosilicate was tested by passing a gaseous feed of methanol over the material contained in a heated quartz reactor. The reaction conditions, the yields of ethylene, $C_3$ and $C_4$ hydrocarbons obtained therefrom and the methanol conversions are given in the following Table.

EXAMPLE 4

10 g of the dry aluminosilicate powder prepared by the method described in Example 2 was crushed to pass 16 mesh (BSS) and mixed with 10 g Ludox colloidal silica (containing 30% by weight silica), evaporated to dryness on a steambath and finally dried at 120° C. The mixture was then broken down to pass 5–8 mesh (BSS) and activated by heating in air at 500° C. for 16 hours.

The aluminosilicate-containing mixture was then tested for catalytic activity in the manner described in Example 3 under the conditions and with the results given in the following Table.

Examples 3 and 4 demonostrate that the aluminosilicates prepared as described in Examples 1 and 2 are active catalysts for the dehydration of methanol.

TABLE

| Example | Contact time* (secs at NTP) | Reaction temperature (°C.) | % Yield on methanol fed** | | | Methanol conversion*** (%) |
|---|---|---|---|---|---|---|
| | | | $C_2$ | $C_3$ | $C_4$ | |
| 3 | 2.7 | 400 | 9 | 15 | 17 | 100 |
| 4 | 3.0 | 400 | 6 | 16 | 22 | 100 |

*The contact time is defined as:
$$\frac{\text{Volume of catalyst in mls}}{\text{Total volume of gas (in mls/sec at NTP)}}$$

**The % yield of $C_2$ on methanolfed is defined as:
$$\frac{\text{Moles of methanol converted to } C_2}{\text{Total moles of methanol fed}}$$

***The remaining products were a complex mixture of straight- and branched-chain hydrocarbons and aromatics.

We claim:
1. A method for preparing a crystalline aluminosilicate which method comprises mixing a source of silica, a source of alumina, a source of alkali metal, water and at least one monoalkanolamine selected from the group consisting of mono-ethanolamine and mono-propanolamine, said source of silica to said source of alumina being in the range of from 10:1 to 150:1 based on the equivalent moles of silica and alumina in the respective sources, and maintaining the mixture at a temperature in the range of from about 80° to 210° C. and a pressure in the range from about 70 to 400 psig for a time greater than four hours.

2. A method for preparing an aluminosilicate which method comprises mixing a source of silica, a source of alumina, a source of alkali-metal, water and a monoalkanolamine selected from the group consisting of mono-ethanolamine and mono-propanolamine and monoalkanolamine formed in situ from an alkylene oxide selected from the group consisting of ethylene oxide, propylene oxide and combinations thereof and ammonia, and maintaining the mixture at a temperature in the range of from about 80° to 210° C. and a pressure in the range from about 70 to 400 psig for a time greater than four hours.

3. A method according to either one of claims 1 and 2 wherein said source of silica is an aqueous colloidal dispersion of silica particles, said source of alumina is sodium aluminate prepared by dissolving alumina particles in excess sodium hydroxide solution and said alkali metal is sodium in the form of sodium hydroxide.

4. A method according to either one of claims 1 and 2 wherein said mono-alkanolamine is mono-ethanolamine or the precursors thereof, said precursors consisting of ethylene oxide and ammonia.

5. A method according to either one of claims 1 and 2 wherein, in said mixture, the ratio of said silica source to said alumina source is in the range 10:1 to 150:1 based on the equivalent moles of silica and alumina in the respective sources, said alkali metal source is present in an amount from 50 to 0.02 moles per mole equivalent of total silica and alumina in their respective sources and said alkanolamine is present in an amount from 50 to 0.02 moles per mole equivalent of total silica and alumina in their respective sources.

6. A method according to claim 15 wherein the molar ratio of said ammonia to said alkylene oxide in said mixture is in the range from 10:1 to 2:1.

7. A method as defined in claim 1 wherein the aluminosilicate obtained is impregnated with a compound of one or more metals selected from the group consisting of copper, silver, zinc, gallium, indium, thallium, lead, antimony, bismuth, iron, cobalt, nickel, ruthenium, rhodium, palladium, iridium, and platinum.

8. A method as defined in claim 1 wherein a boron compound is incorporated into the aluminosilicate obtained and the admixture is then heated.

9. A method as defined in claim 1 wherein a phosphorus compound is incorporated into the aluminosilicate obtained and the admixture is then heated.

* * * * *

UNITED STATES PATENT AND TRADEMARK OFFICE
CERTIFICATE OF CORRECTION

PATENT NO. : 4,242,233
DATED : December 30, 1980
INVENTOR(S) : William J. Ball, Keith W. Palmer and David G. Stewart It is certified that error appears in the above-identified patent and that said Letters Patent are hereby corrected as shown below:

In Other Publications, "HFRT" should read --HEFT--.

In the Abstract, line 9, before "in situ'", insert --'--.

Col. 1, line 54, "source" should read --sources--.

Col. 5, line 8, "Periodical" should read --Periodic--.

Signed and Sealed this

Eighteenth Day of August 1981

[SEAL]

Attest:

GERALD J. MOSSINGHOFF

Attesting Officer    Commissioner of Patents and Trademarks